United States Patent
Shu et al.

(10) Patent No.: US 11,299,660 B2
(45) Date of Patent: Apr. 12, 2022

(54) THREE-COMPONENT MIXED WORKING FLUID FOR INTERNAL COMBUSTION ENGINE WASTE HEAT RECOVERY POWER CYCLE

(71) Applicant: TIANJIN UNIVERSITY, Tianjin (CN)

(72) Inventors: Gequn Shu, Tianjin (CN); Peng Liu, Tianjin (CN); Hua Tian, Tianjin (CN); Zhigang Yu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 17/044,800

(22) PCT Filed: Mar. 4, 2019

(86) PCT No.: PCT/CN2019/076813
§ 371 (c)(1),
(2) Date: Oct. 1, 2020

(87) PCT Pub. No.: WO2020/140320
PCT Pub. Date: Jul. 9, 2020

(65) Prior Publication Data
US 2021/0317354 A1     Oct. 14, 2021

(30) Foreign Application Priority Data

Dec. 30, 2018 (CN) .......................... 201811648235.6

(51) Int. Cl.
*C09K 5/04* (2006.01)
*C09K 5/10* (2006.01)

(52) U.S. Cl.
CPC ............... *C09K 5/045* (2013.01); *C09K 5/10* (2013.01)

(58) Field of Classification Search
CPC ............ C09K 5/045; C09K 5/10; Y02P 20/10
USPC .............................................. 252/67; 60/597
See application file for complete search history.

(56) References Cited

U.S. PATENT DOCUMENTS

| | | | |
|---|---|---|---|
| 8,024,937 B2 * | 9/2011 | Minor | F25B 49/005 62/115 |
| 2008/0314073 A1 * | 12/2008 | Minor | C09K 5/045 62/498 |
| 2012/0067049 A1 * | 3/2012 | Woolley | F01K 25/06 60/671 |

FOREIGN PATENT DOCUMENTS

| | | | |
|---|---|---|---|
| CN | 101688817 A | 3/2010 | |
| CN | 103013450 A | 4/2013 | |
| CN | 105062426 A | 11/2015 | |
| CN | 105102905 A | 11/2015 | |
| CN | 108716435 U | 10/2018 | |
| EP | 2980508 A4 * | 5/2016 | ............. C09K 5/045 |
| JP | 5435859 B2 | 3/2014 | |
| WO | WO-2017012167 A1 * | 1/2017 | ............... C09K 5/04 |

OTHER PUBLICATIONS

International Search Report of PCT/CN2019/076813.
Written Opinion of PCT/CN2019/076813.

* cited by examiner

*Primary Examiner* — Douglas J McGinty
(74) *Attorney, Agent, or Firm* — Dragon Sun Law Firm, PC; Jinggao Li, Esq.

(57) ABSTRACT

The present invention discloses a three-component mixed working fluid for an ICE waste heat recovery power cycle, wherein the three-component mixed working fluid consists of carbon dioxide, pentane and a refrigerant, the refrigerant is a high-performance environment-friendly refrigerant with GWP value which is lower than 1000 and ODP value which is 0, and the refrigerant is one selected from a group consisting of difluoromethane, fluoroethane and 1,1-difluoroethane; according to the selected refrigerants, the mass percentage of each component is as follow: the mass percentage of $CO_2$, pentane and difluoromethane are 30-70, 10-20, and 10-60; the mass percentage of $CO_2$, pentane and fluoroethane are 30-70/10-20/10-50; the mass percentage of $CO_2$, pentane and 1,1-difluoroethane are 10-70/10-30/10-60. The present invention has good environmental performance, safety performance and thermodynamic performance, and the thermal efficiency is higher than 12% of prior art; and the present invention further has good ability of synergistically recovering waste heat of engine coolant and gas, thus reaching 100% utilization rate of engine coolant, and more than 60% utilization rate of gas. The critical temperature of the three-component mixture is obviously higher than that of $CO_2$, the cooling conditions of the system are relaxed, and the conditions for the waste heat recovery system for vehicles are satisfied.

1 Claim, No Drawings

THREE-COMPONENT MIXED WORKING FLUID FOR INTERNAL COMBUSTION ENGINE WASTE HEAT RECOVERY POWER CYCLE

TECHNICAL FIELD

The application relates to a working fluid for an internal combustion engine waste heat recovery power cycle, and in particular to a three-component mixed working fluid containing $CO_2$, alkane and a traditional refrigerant for a power cycle.

BACKGROUND OF THE PRESENT INVENTION

Waste heat recovery technology is considered to be the key technology to achieve energy saving and emission reduction of internal combustion engines (hereinafter referred to as ICE), which is of great significance to efficient energy utilization. The waste heat of traditional ICEs has the characteristics of large temperature difference and multi-grade. The temperature of exhaust gas is as high as 500° C., accounting for about 25% of the combustion heat of ICEs. Similar to the ratio of exhaust gas is that of the waste heat of engine coolant of ICEs, but the temperature of engine coolant is generally lower than 100° C. Due to the great difference in temperature characteristics of these two kinds of waste heat sources, it is very difficult for them to be efficiently recovered together through the traditional working fluid power cycle. Previous studies show that the organic working fluid have advantages such as non-flammable and non-explosive with good availability. However, they are incapable of efficiently utilizing waste heat from engine coolant, and generally have high Global Warming Potential (GWP) and the Ozone Depletion Potential (ODP) value are high, which has an obvious adverse impact on the environment. The alkane-based working fluids has outstanding thermodynamic performanceworking fluid, but the utilization rate of waste heat of engine coolant is also low, and the safety is poor. $CO_2$ has good thermodynamic performance, which can efficiently recover high-grade and low-grade waste heat sources of ICEs at the same time, and $CO_2$ contributes to the miniaturization and simplification of the WHR plant. Meanwhile, $CO_2$ is a natural substance with less impact on the environment, which shows great potential of application to the field of high-temperature waste heat recovery. However, $CO_2$ has a relatively low critical temperature, meaning that it is difficult to be condensed by an ambient cooling source, which restricts its application to the field of waste heat recovery of ICEs. If the above three kinds of working fluid mediums are mixed according toa certain ratio to form a mixed working medium, the advantages of the three kinds of working fluid mediums can make up for each other. Finally, a high-performance, environment-friendly and safe working fluids for waste heat recovery power cycle for vehicles will be formed.

SUMMARY OF THE PRESENT INVENTION

To overcome the deficiencies of the prior art, the application provides a three-component mixed working fluids for an internal combustion engine waste heat recovery power cycle, which is safe, environment-friendly and high-performance, satisfies cooling conditions for vehicles, and has good thermodynamic performance.

In order to solve the above technical problem, the three-component mixed working fluid for the ICE waste heat recovery power cycle provided by the invention consists of carbon dioxide, pentane and a refrigerant, wherein the refrigerant is a high-performance environment-friendly refrigerant with GWP value which is lower than 1000 and ODP value which is 0, and the refrigerant is one selected from a group consisting of difluoromethane, fluoroethane and 1,1-difluoroethane; according to the selected refrigerant, the mass percentage of each component is as follow:

when the refrigerant is difluoromethane, comprising 10-20% by weight of pentane, 10-60% by weight of difluoromethane, and the rest is carbon dioxide; when the refrigerant is fluoroethane, comprising 10-20% by weight of pentane, 10-50% by weight of fluoroethane, and the rest is carbon dioxide;

when the refrigerant is 1,1-difluoroethane, comprising 10-30% by weight of pentane, comprising 10-60% by weight of 1,1-difluoroethane, and the rest is carbon dioxide.

Compared with the prior art, the present invention has the following beneficial effects:

The mixed working fluid provided by the present invention is formed by mixing $CO_2$ and alkane working fluids and another refrigerant working fluid (any one of difluoromethane, fluoroethane and 1,1-difluoroethane) with GWP value which is lower than 1000 and ODP value which is 0. Specifically, the alkane working fluid is pentane, which has outstanding thermodynamic performance. The safety performance of the refrigerant used in the above mixed working fluid meets the safety requirements on A2 working fluids in standard ANSI/ASHRAE34-2010, the mass percentage of the alkane working fluid is less than 30%, and $CO_2$ has a flame-retardant effect, so it has very high safety performance. The GWP value of the refrigerant in the mixed working fluid is lower than 1000, and the ODP value is 0. The GWP value and ODP value of $CO_2$ and pentane are very small. The mixed working fluid according to the present invention has good overall environmental performance-working fluid, i.e., ODP (ozone depletion potential value)=0 and GWP (greenhouse effect potential value)<100.

Under ambient temperature conditions (i.e. under the temperature of 298K and the pressure of 1 atm), the mixed working fluid according to the present invention possesses a strong coupling recovery capability for high and low grade waste heat source, i.e., engine coolant and gas, thus reaching 100% utilization rate of engine coolant, and more than 60% utilization rate of exhaust gas. The present invention further has good thermodynamic performance, and the thermal efficiency is higher than 12% under given design conditions of waste heat recovery power cycle. Finally, the present invention further has small irreversible heat loss. The three-component non-azeotropic mixed working fluid of the present invention exists temperature slip in the heat transfer process, thus effectively reduces irreversible loss in heat exchangers.

DETAILED DESCRIPTION OF THE PRESENT INVENTION

The technical solution of the application will be further described below in detail in combination with the specific embodiments. The described specific embodiments are only used for describing the present invention, are not intended to limit the present invention.

The content of each component of the mixed working fluid in the embodiments refers to mass percentage.

Embodiment A1: $CO_2$, pentane and R32 were mixed according to a ratio of 60:20:20 to obtain a mixture which was then filled into a system.

Embodiment A2: $CO_2$, pentane and R32 were mixed according to a ratio of 70:20:10 to obtain a mixture which was then filled into a system.

Embodiment A3: $CO_2$, pentane and R32 were mixed according to a ratio of 50:20:30 to obtain a mixture which was then filled into a system.

Embodiment A4: $CO_2$, pentane and R32 were mixed according to a ratio of 30:10:60 to obtain a mixture which was then filled into a system.

Embodiment B1: $CO_2$, pentane and R161 were mixed according to a ratio of 70:10:20 to obtain a mixture which was then filled into a system.

Embodiment B2: $CO_2$, pentane and R161 were mixed according to a ratio of 60:20:20 to obtain a mixture which was then filled into a system.

Embodiment B3: $CO_2$, pentane and R161 were mixed according to a ratio of 60:10:30 to obtain a mixture which was then filled into a system.

Embodiment B4: $CO_2$, pentane and R161 were mixed according to a ratio of 30:20:50 to obtain a mixture which was then filled into a system.

Embodiment C1: $CO_2$, pentane and R152 a were mixed according to a ratio of 60:20:20 to obtain a mixture which was then filled into a system.

Embodiment C2: $CO_2$, pentane and R152 a were mixed according to a ratio of 70:20:10 to obtain a mixture which was then filled into a system.

Embodiment C3: $CO_2$, pentane and R152 a were mixed according to a ratio of 50:10:40 to obtain a mixture which was then filled into a system.

Embodiment C4: $CO_2$, pentane and R152 a were mixed according to a ratio of 40:10:50 to obtain a mixture which was then filled into a system.

Critical parameters of the three-component mixed working fluid in each embodiment were listed in Table 1.

TABLE 1

| Critical parameters of mixed working fluid | | |
| --- | --- | --- |
| Working medium fluid | Critical pressure (MPa) | Critical temperature (° C.) |
| $CO_2$ | 7.38 | 31.1 |
| Pentane | 3.37 | 196.6 |
| R161 | 5.09 | 102.2 |
| R152a | 4.52 | 113.3 |
| R32 | 5.78 | 78.1 |
| Embodiment A1 | 8.32 | 74.9 |
| Embodiment A2 | 8.66 | 71.1 |
| Embodiment A3 | 8.07 | 79.7 |
| Embodiment A4 | 7.27 | 77.4 |
| Embodiment B1 | 7.11 | 60.3 |
| Embodiment B2 | 7.44 | 77.7 |
| Embodiment B3 | 6.71 | 67.0 |
| Embodiment B4 | 6.14 | 98.1 |
| Embodiment C1 | 7.68 | 78.4 |
| Embodiment C2 | 8.37 | 73.0 |
| Embodiment C3 | 6.40 | 73.8 |
| Embodiment C4 | 6.06 | 81.9 |

Under the target engine waste heat condition, the specific design conditions of waste heat recovery power cycle are as follows: the dew point temperature of the exhaust gas being 120° C., the isentropic efficiency of the expander being 0.7, the isentropic efficiency of the working fluid pump being 0.8, and the pitch point temperature difference in the preheater, the gas heater, the regenerator and the condenser being 5K, 30K, 15K and 5K, respectively. The inlet pressure of the turbine being 10 MPa and the inlet temperature being 550K. The main indicators of the power cycle in partial embodiments are listed in Table 2.

TABLE 2

| Performance of the embodiments | | | |
| --- | --- | --- | --- |
| Parameter | Embodiment A1 | Embodiment B1 | Embodiment C1 |
| Gas temperature/° C. | 517.3 | 517.3 | 517.3 |
| Gas flow rate/kg/s | 0.237 | 0.237 | 0.237 |
| Engine coolant heat/kW | 124.2 | 124.2 | 124.2 |
| Engine coolant flow rate/kg/s | 2.87 | 2.87 | 2.87 |
| Gas utilization rate | 69% | 69.1% | 75.75% |
| Engine coolant utilization rate | 100% | 100% | 100% |
| Output power/kW | 25.4 | 26.5 | 24.4 |
| Thermal efficiency | 13.00% | 13.48% | 12.4% |
| Efficiency | 41.05% | 42.9% | 39.53% |

From the above embodiments and relevant calculation data (the parameters and implementation results of the working fluids in the embodiments can be obtained through the thermodynamic calculation commonly used and known by those skilled in the art), it can be seen the three-component mixed working fluid obtained by mixing $CO_2$, pentane and a refrigerant in the application can effectively recover the waste heat of exhaust gas and engine coolant, the exhaust gas utilization rate is higher than 60%, and the engine coolant utilization rate reaches 100%. Under the situation of meeting the requirements on environmental protection and safety, the thermodynamic performance is excellent, and the thermal efficiency of the power cycle is higher than 12% under the design conditions. The critical temperature of the three-component mixture is obviously higher than that of $CO_2$, the low-temperature condensation issue encountered with $CO_2$ is alleviated.

Although the application has been described above, the application is not limited to the above specific embodiments, which are only illustrative rather than restrictive. Those skilled in the art may make many variations without departing from the purpose of the application under the inspiration of the application, which are all within the scope of protection of the application.

What is claimed is:

1. A three-component mixed working fluid for an internal combustion engine waste heat recovery power cycle, wherein the three-component mixed working fluid for the internal combustion engine waste heat recovery power cycle consists of carbon dioxide, pentane and a refrigerant, the refrigerant is a high-performance environment-friendly refrigerant with GWP value which is lower than 1000 and ODP value which is 0, and the refrigerant is one selected from a group consisting of difluoromethane, fluoroethane and 1,1-difluoroethane; according to the selected refrigerants, the mass percentage of each component is as follow:

when the refrigerant is difluoromethane, comprising 10-20% by weight of pentane, 10-60% by weight of difluoromethane, and the rest is carbon dioxide;

when the refrigerant is fluoroethane, comprising 10-20% by weight of pentane, 10-50% by weight of fluoroethane, and the rest is carbon dioxide;

when the refrigerant is 1,1-difluoroethane, comprising 10-30% by weight of pentane, comprising 10-60% by weight of 1,1-difluoroethane, and the rest is carbon dioxide.

* * * * *